UNITED STATES PATENT OFFICE.

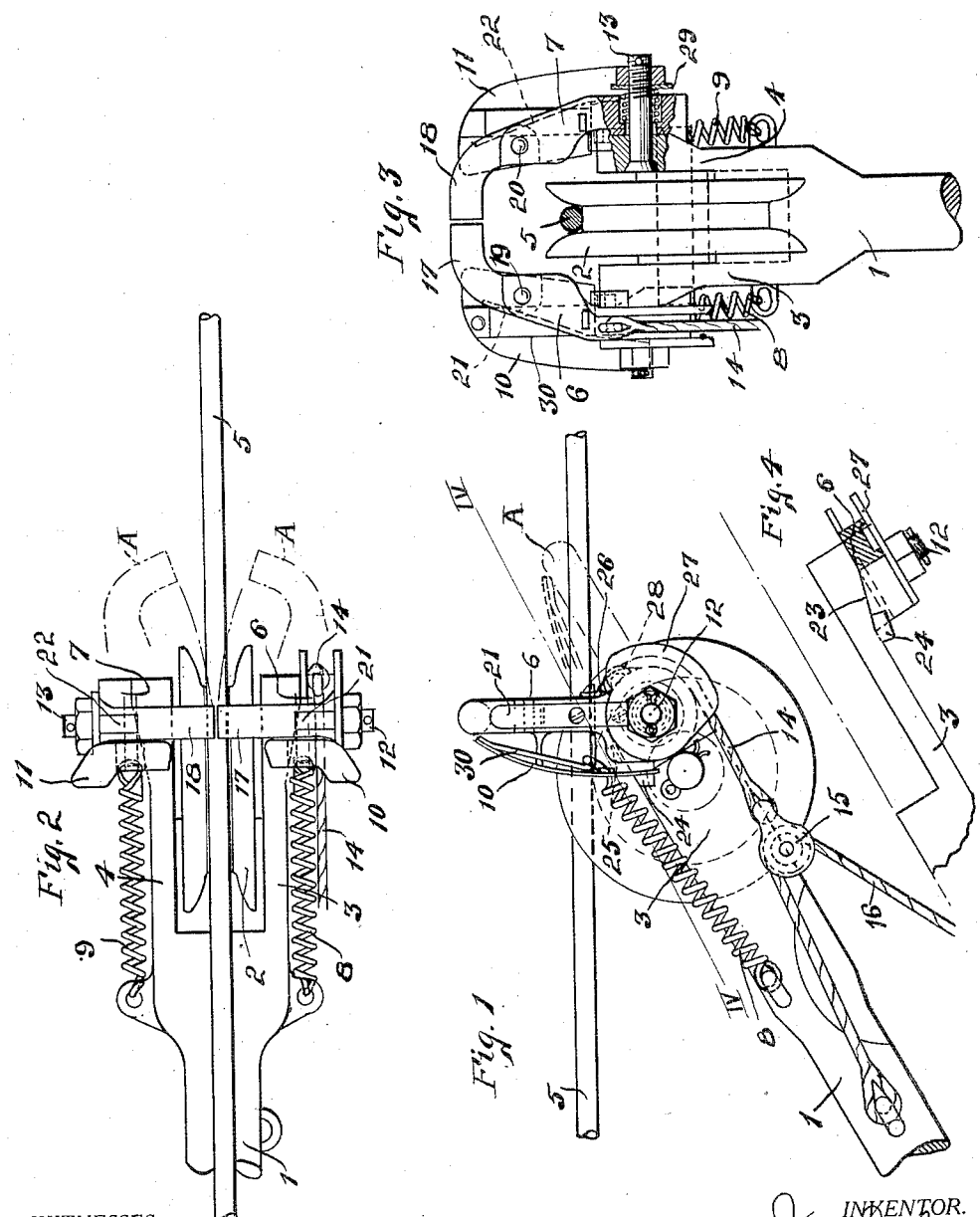

JOHN J. SABO, OF PITTSBURGH, PENNSYLVANIA.

TROLLEY.

1,076,788.  Specification of Letters Patent.  Patented Oct. 28, 1913.

Application filed August 19, 1912.  Serial No. 715,764.

*To all whom it may concern:*

Be it known that I, JOHN J. SABO, a subject of the Emperor of Austria-Hungary, and residing at Pittsburgh, in the county of Allegheny and State of Pennsylvania, have invented certain new and useful Improvements in Trolleys, of which the following is a specification.

The invention relates to trolleys; and has for its primary objects; the provision of improved means for preventing the trolley from jumping off its wire, and the provision of an improved finder adapted to facilitate the replacement of the trolley upon the wire.

One embodiment of the invention is illustrated in the accompanying drawing, wherein—

Figs. 1, 2, and 3 are respectively a side elevation, a plan view, and an end elevation, of the trolley in position upon a trolley wire, and Fig. 4 is a section through one of the guard or finder fingers, on the line IV—IV of Fig. 1.

In its preferred form the device includes the ordinary trolley provided with a pair of swinging fingers yieldingly held in one extreme of position with their ends overlying the wire and constituting a guard to prevent the accidental displacement of the trolley wheel. Means are provided so that when the trolley reaches the ball or plate connection for the supporting cross wires, the two fingers are cammed to the rear and at the same time opened so as to permit the passage therethrough of the lug projecting downward from the plate or ball and secured to the trolley wire. One of the fingers is preferably so connected to the cable for swinging the trolley that when force is applied to swing the trolley the guard finger is swung to one extreme of movement and thus moved laterally so that the trolley can be removed from the wire. The finger which remains in upright position also constitutes a finding finger for readily placing the wheel upon the wire when it is once displaced, all that is necessary being to place the face of the guard finger against the trolley wire, thus bringing the wheel below the wire, and then releasing the cable. This feature I regard as important, and its application is valuable even when the finger is not used as a guard finger and does not have the end overlying the wire.

The principal parts shown in the drawings are as follows: 1 is the usual trolley pole normally held upward by a powerful spring, in the usual way; 2 is the trolley wheel which may be of any approved form, such trolley wheel being pivotally carried in the sides 3 and 4 of the usual fork at the upper end of the trolley pole 1; 5 is the trolley wire; 6 and 7 are the guard fingers normally held in the position illustrated in full lines in Fig. 1, by reason of the springs 8 and 9; 10 and 11 are cam plates carried by the fingers 6 and 7 and adapted to contact with the ball or plate to which the cross connecting wires for supporting the trolley wire are attached such plates being thin strips of material secured in any desired way to the fingers; 12 and 13 are the bolts upon which the fingers 6 and 7 are pivoted; 14 is a wire for swinging the finger 6, such wire carrying at its end the sheave 15; and 16 is the cable for swinging the trolley pole 1 downward and at the same time swinging the finger 6. The dotted lines A—A, Figs. 1 and 2, indicate the position of the fingers 6 and 7 when they are swung from their normal position as the trolley passes the plate or ball to which the cross connections for supporting the trolley wire are attached.

As indicated most clearly in Fig. 3, the ends 17 and 18 of the fingers 6 and 7 are turned in so as to lie over the trolley wire 5, and these ends are pivotally connected at 19 and 20 to the body portions of the fingers 6 and 7. The ends 17 and 18 are normally held in the position indicated in Fig. 3 by means of leaf springs 21 and 22 (Figs. 1 and 3) whose lower portions are connected to the fingers 6 and 7, and whose upper ends overlie the sides of the ends 17 and 18. These pivoted ends 17 and 18 are operated when the trolley wire is supported by a lug without any ball or plate thereabove for engagement with the cams 10 and 11, or when for any reason the fingers 6 and 7 are not separated to the position indicated in dotted lines when the trolley passes an obstruction in the form of a cross support. The ordinary ball or plate support does not operate these fingers, as the ordinary ball or plate support will engage the cam surfaces 10 and 11 and swing the fingers to the position indicated in dotted lines, which movement causes the ends of the fingers to clear the wire without the swinging of such ends about the pivotal supports 19 and 20.

As indicated most clearly in Fig. 4, the arms 6 and 7 have their bearing faces 23 inclined, so that when the fingers swing from the position indicated in full lines in Fig. 1 to the position indicated in dotted lines in Figs. 1 and 2, the fingers move apart, thus permitting the ends of the fingers to pass the depending lug below the plate or ball which carries the cross wires. In order that the engagement between the fingers and the ball or plate may be gradual, and such parts saved from injury, the inclined cam plates 10 and 11 are secured to the front faces of the fingers 6 and 7, and these cam plates engage the supporting ball or plate when the trolley reaches the cross connection. Stops 24 (Figs. 1 and 4) are provided upon the sides of the fork, which stops engage the fingers 6 and 7 and limit the movement of the fingers to the left as such fingers are pulled in that direction by the springs 8 and 9. The fingers 6 and 7 are also provided with stops 25 upon their inner faces, which stops 25 are adapted to take against other stops 26 carried by the sides of the fork, thus limiting the swinging movement of the fingers to the right, stopping them in the position indicated in dotted lines in Fig. 1. One of the fingers is provided with a sheave portion 27 and with a hook 28 to end of which the member 14 is attached, so that when force is applied to the cable 16 to move the trolley wheel, the finger 6 is swung to the position indicated in dotted lines. The other finger 7 may also be used as a finder when the finger 6 is moved to the position shown in dotted lines in Fig. 1. The fingers 6 and 7 are caused to seat tightly against their bearing surfaces upon the arms 3 and 4, by reason of springs 29 (Fig. 3), which springs are mounted in recesses in the fingers and press the fingers inwardly against their bearing surfaces. The fingers are mounted with sufficient looseness on the bolts 12 and 13 to permit them to swing at an angle thereto in moving to the positions indicated in dotted lines in Fig. 2. The cam plates 10 and 11 are preferably secured to the arms by means of spring members 30, the extreme lower ends of the cam plates being free to swing back and forth to some extent. The cam plates 10 and 11 are preferably made of sheet metal and are attached to the fingers 6 and 7 by means of the strips of metal 30 secured to the backs of the plates and to the fingers. The spring plates are mounted more or less yieldingly in order to reduce the force of the impact when these plates strike the supporting balls or plates to which the cross wires are attached.

Having thus described my invention and illustrated its use, what I claim as new and desire to secure by Letters Patent, is the following:

1. In combination in a trolley, a fork having inclined bearing surfaces at the sides thereof, a wheel mounted in the fork, a pair of fingers mounted on opposite sides of the fork and yieldingly held with their ends over the wire and pivoted to swing backward and laterally with their lateral faces bearing against said surfaces to release the wire when the wheel passes a cross wire, springs for holding the fingers against their inclined bearing surfaces, and means for pulling the wheel away from the wire and swinging one of the fingers to a position at the side of the wire while leaving the other finger in its normal position.

2. In combination in a trolley, a fork having inclined bearing surfaces at the sides thereof, a wheel mounted in the fork, a pair of fingers pivotally mounted on the fork with their lateral faces bearing against said inclined surfaces for swinging movement longitudinally of the wire and laterally with respect thereto, means for yieldingly maintaining the fingers in upright position, springs for holding the fingers against their inclined bearing surfaces with their ends lying over the wire, and means secured to one finger and adapted to pull the wheel away from the wire and swing the finger while leaving the other finger in its upright position.

3. In combination in a trolley, a fork having inclined surfaces at the sides thereof, a wheel mounted in the fork, a pair of pivoted fingers having inclined surfaces engaging said other inclined surfaces, means for holding the said fingers in upright position with their ends overlying the wheel, and springs carried by the fingers for yieldingly holding the inclined surfaces on the fingers against the inclined surfaces on the fork.

4. In combination in a trolley, a fork having inclined surfaces at the sides thereof, a wheel mounted in the fork, a pair of pivoted fingers having inclined surfaces engaging said other inclined surfaces, means for holding the said fingers in upright position with their ends overlying the wheel, and inclined resilient buffer members carried by the said fingers.

In testimony whereof I have hereunto signed my name in the presence of the two subscribed witnesses.

JOHN J. SABO.

Witnesses:
HARVEY L. LECHNER,
ARCHWORTH MARTIN.

Copies of this patent may be obtained for five cents each, by addressing the "Commissioner of Patents, Washington, D. C."